(12) United States Patent
Schlösser

(10) Patent No.: US 6,810,921 B2
(45) Date of Patent: Nov. 2, 2004

(54) METHOD OF AND DEVICE FOR DISPENSING BULK MATERIAL

(75) Inventor: Werner Schlösser, Hennef (DE)

(73) Assignee: BMH Chronos Richardson, GmbH, Hennef (DE)

( * ) Notice: Subject to any disclaimer, the term of this patent is extended or adjusted under 35 U.S.C. 154(b) by 143 days.

(21) Appl. No.: 10/281,438

(22) Filed: Oct. 28, 2002

(65) Prior Publication Data

US 2003/0155382 A1 Aug. 21, 2003

(30) Foreign Application Priority Data

Feb. 20, 2002 (EP) .............................................. 02003771

(51) Int. Cl.⁷ .............................. B65B 1/04; B65B 3/04
(52) U.S. Cl. ........................... 141/2; 141/255; 141/256; 141/258; 141/259; 366/158.4; 366/156.1; 222/239; 222/241; 222/246
(58) Field of Search ................................. 141/2, 18, 79, 141/255–260, 264; 222/226, 236, 239, 240–243, 246, 251, 252; 366/155.1, 158.4, 162.2, 156.1

(56) References Cited

U.S. PATENT DOCUMENTS

| 2,014,617 | A | * | 9/1935 | Emil | 222/56 |
| 3,148,802 | A | * | 9/1964 | Webb | 222/643 |
| 3,248,019 | A | * | 4/1966 | Kohler | 222/227 |
| 5,339,998 | A | * | 8/1994 | Warren | 222/241 |

* cited by examiner

Primary Examiner—Timothy L. Maust

(57) ABSTRACT

A method of filling containers, especially bags, with bulk material by a feeding funnel and a filler pipe. The filler pipe adjoins the lower end of the feeding funnel. An axially displaceable and rotatable conveying unit is arranged co-axially within the filler pipe. An axially displaceable and rotatable closing element is firmly connected to the lower end of the conveying unit. The bulk material, while being conveyed by the conveying unit in the filler pipe, is simultaneously mechanically agitated in the filling funnel, or simultaneously mechanically conveyed in the filling funnel towards the filler pipe.

12 Claims, 3 Drawing Sheets

METHOD OF AND DEVICE FOR DISPENSING BULK MATERIAL

FIELD OF THE INVENTION

The invention relates to a method of filling containers, especially bags, with bulk material by a feeding funnel and a filler pipe. The filler pipe adjoins the lower end of the feeding funnel. The filler pipe includes an axially displaceable and rotatable conveying unit arranged co-axially in the filler pipe. Also, an axially displaceable and rotatable closing element is positioned at the lower end of the filler pipe. The closing element is firmly connected to the lower end of the conveying unit. Furthermore, the invention relates to a device for filling containers, especially bags, with bulk material. The device includes a feeding funnel and a filler pipe. The filler pipe adjoins the lower end of the feeding funnel. The filler pipe includes an axially displaceable and rotatable conveying unit arranged co-axially in the filler pipe. Also, an axially displaceable and rotatable closing element is positioned at the lower end of the filler pipe. The closing element is firmly connected to the lower end of the conveying unit.

BACKGROUND OF THE INVENTION

A method and device are known from DE 199 62 475 A1. Here a worm-or-spiral-shaped conveying unit, at its lower end, is firmly connected to a closing cone. Accordingly, a joint rotary drive and a joint lifting drive can be used for the conveying unit and the closing element. In a preferred embodiment, it is possible to continuously adjust the lifting height of the closing element and to rotatingly drive the closing element when the closing element is open. This achieves particularly advantageous dispensing results while avoiding the risk of the formation of bridges in the exit gap between the filler pipe and the closing element. If the bulk material is sticky it constitutes a problem. When conveying sticky material, it is possible, in spite of the forced conveyance taking place from the filler pipe to the exit gap, for the sticky material to continue to form bridges in, and adhere to the wall of the feeding funnel. The bridges and adhesion fundamentally and adversely affect the dispensing function of the device. In addition, even if the device still dispenses accurately, problems still exist. One such problem is bulk material adhering to the wall of the feeding funnel. It is possible, at a later stage, for the aged, sticking or baked bulk material to break loose from the feeding funnel. This breaking off is totally unacceptable in view of the required quality of the bulk material, or in the case of food, for hygienic reasons. The wedge shape of the feeding funnel favors the occurrence of such defects.

DE 198 28 559 C1 illustrates a dispensing device of a similar type. Here the assembly includes a conical feeding tunnel and an adjoining filler pipe. A spiral-shaped, rotatingly drivable conveying unit is positioned in the filler pipe. An independently rotatingly drivable and axially displaceable closing element is arranged. The conveying unit extends upwardly into the feeding funnel. The conveying unit carries a bar-shaped stirring mechanism at its upper end in the feeding funnel. The closing element can be withdrawn into the filler pipe towards the conveying spiral ending at a higher level to open an annual exit gap. This can result in a compaction of the flow of filled-in bulk material and to dispensing interference.

SUMMARY OF THE INVENTION

It is an object of the present invention to provide a method and device that dispenses problematic bulk material. Accordingly, sticky bulk material with a tendency to form bridges can be dispensed in constant quantities and in a constant material quality. A first solution provides a method where the bulk material, while being conveyed by the conveying unit in the filler pipe, is simultaneously mechanically agitated by an agitating means in the feeding funnel. This solution provides a device including a feeding funnel with a conical shape and agitating elements close to the wall of the feeding funnel. The agitating elements are rotatably drivable around the funnel axis. In a second solution, the bulk material, while being conveyed by the conveying unit in the filler pipe, is simultaneously mechanically conveyed by conveying means in the feeding funnel feeding bulk material towards the filler pipe. This solution provides a device including a conical shape feeding funnel. Conveying elements are rotatably drivable around the funnel axis in the feeding funnel.

These two solutions can be used on their own or in combination with one another. According to the first solution, the bulk material is agitated in the feeding funnel. The agitating elements are close to the funnel wall preventing any bulk material from adhering to the wall. This ensures a constant flow of material to the filler pipe. The agitating elements are in the form of leaves extending parallel to the wall of the feeding funnel. The leaves are preferably arranged to extend axially non-displaceable relative to the funnel axis. The leaves are at a constant distance from the funnel wall. The constant distance of the leaves from the wall of the feeding funnel ensures that the agitating process is continuously effective. Agitation in the feeding funnel takes place at a lower rotation frequency than the driving of the conveying unit for the purpose of conveying the bulk material in the filler pipe. The agitating elements in the feeding funnel and the conveying unit in the filler pipe can be driven, via suitable transmission ratios, by a common drive unit. Also it is possible to provide separate drive units. Thus, continuous agitation in the feeding funnel is possible even in cases where the rotatingly drivable conveying unit is not driven and when the closing element is in the closed position.

According to a second solution, inside the feeding funnel, especially in a central region, the bulk material is additionally conveyed towards the filler pipe. If there is only a risk of forming bridges of powdery materials and if the stickiness of the material is less of a concern, the second solution ensures a reliable flow of material from the feeding funnel into the filler pipe. Accordingly, the conveying means in the filling funnel is driven at the same rotation frequency as the conveying unit in the filler pipe conveying the bulk material. In this connection, the conveying elements in the feeding funnel are arranged at a constant axial distance from the conveying unit in the filler pipe. Thus the lifting and lowering of the conveying unit cannot result in internal compaction processes. It is particularly advantageous to use the same drive unit. The drive unit can also act on a single common drive shaft. The drive shaft is firmly connected to both the conveying unit in the filler pipe, with an attached closing element, and to the additional conveying elements in the feeding funnel. The shaft is axially adjustable together with the driving motor or relative to the driving motor.

According to a second variant, the conveying elements in the feeding funnel are axially firmly positioned in the feeding funnel, especially in the upper funnel region. Thus, the distance from the axially displaceable conveying unit changes when opening and closing the closing element. This embodiment enables a common drive unit, but it has to drive two shafts which are arranged one inside the other. The shafts are axially displaceable relative to one another. The shafts are provided for the conveying elements in the feeding funnel and for the conveying unit in the filler pipe. The additional conveying elements may have the shape of a worm portion, of individual blades or of a spiral portion. The conveying elements comprise a gradient relative to the axis of the feeding funnel.

On the upper face of the closing element, which is rotatingly drivable together with the conveying unit, it is possible to arrange blades with or without a gradient relative to the longitudinal axis. The blades improve the dispensing flow. The rotational and axial movement of the conveying unit and closing element can, as is already known, be controlled independently of one another or depend on one another in accordance with certain functions. The closing cone at the lower end of the conveying unit is preferably removably attached. However, in the fully assembled condition, the two parts form a structural unit. In this way, pockets of dirt and dead spaces in the material flow can already largely be avoided by design measures. The conveying unit is preferably an endless worm on a central shaft. In a preferred embodiment, the closing cone has the same cross-section as the shaft where it directly joins the shaft. In its lowest region with the greatest diameter, the closing cone includes a sealing portion. When the closing cone is in the lifted position, the sealing portion sealingly rests against the lower end of the filler pipe.

Additional objects and advantages of the present invention will become apparent from the detailed description of the preferred embodiment, and the appended claims and accompanying drawings, or may be learned by practice of the invention.

DETAILED DESCRIPTION OF THE PREFERRED EMBODIMENTS

Figure 1:
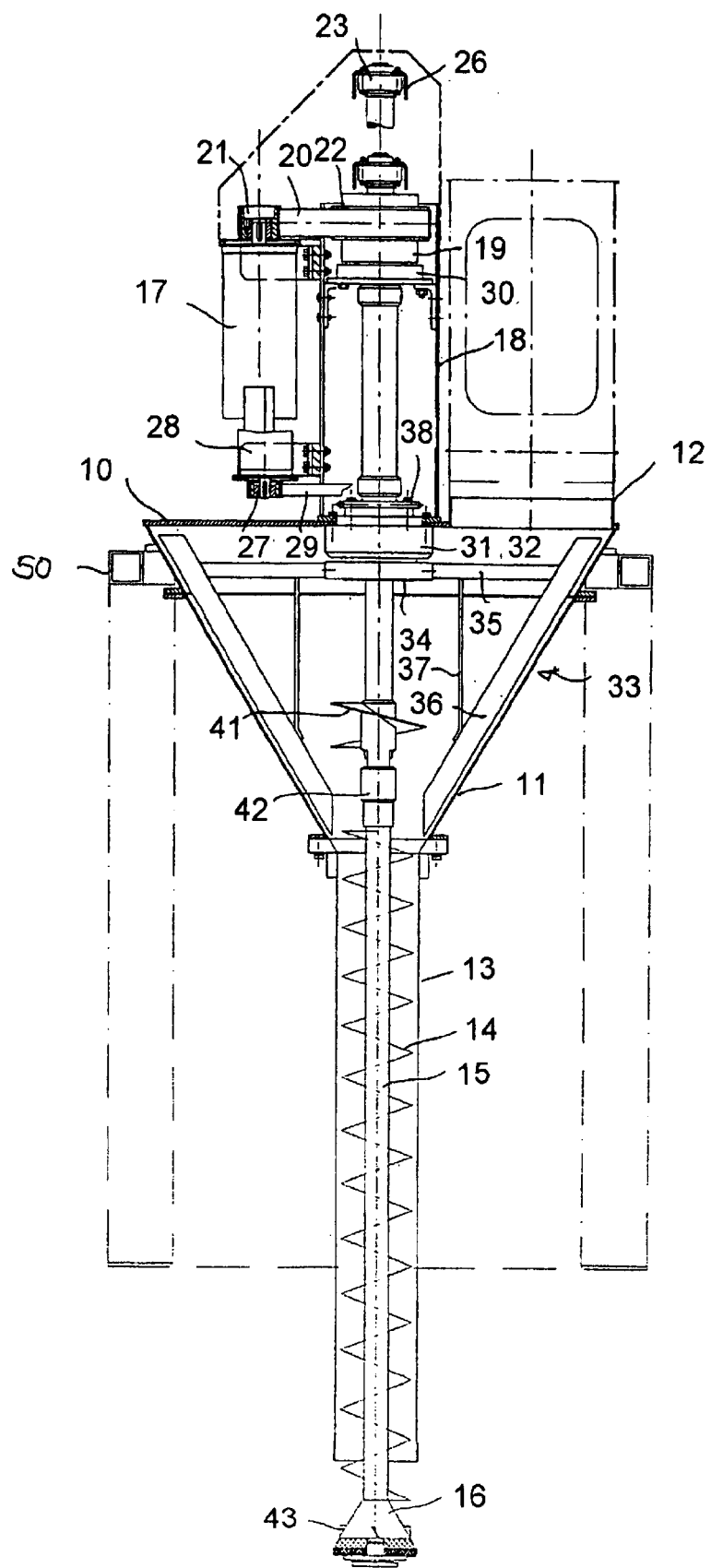
FIG. 1 is an axial section view of the complete device in an open position with the closing element wide open.

FIG. 1 illustrates a device of the invention with a conical feeding funnel 11 with a filler sleeve 12 adjoining the top end of the feeding funnel 11. The filler sleeve 12 is axially offset. A filler pipe 13 co-axially adjoins the lower end of the feeding funnel 11. A conveying worm 14 is arranged in the filler pipe. The conveying worm 14 is carried by a worm shaft 15. A closing cone 16 is arranged at the lower end of the worm shaft 15. The closing cone 16 widens towards its lower end.

The feeding funnel 11 is covered by a base plate 10 for the supporting and driving means. The supporting and driving means are carried by a frame 18. The shaft is supported twice in a way described hereinafter. The shaft is driven by a cog belt 20 coupled to a driving motor 17 which is bolted to the frame 18.

A first belt pulley 21 is arranged on the shaft journal of the driving motor 17. A second belt pulley 22 is arranged on a driving sleeve 19. The worm shaft 15 is rotationally secured and axially displaceable on the sleeve 19. The driving sleeve 19 can be a torque ball bush whose balls engage ball grooves. The upper end of the worm shaft 15 is suspended by an axial bearing 23 in a portal carrier 26. In FIG. 1 the bearing 23 and carrier 26 are shown jointly in two different axial positions.

A setting motor 28 adjusts the portal carrier 26. The setting motor 28 is also bolted to the frame 18. The setting motor 28 acts on a cog belt 29. A first belt pulley 27 can be seen on the shaft journal of the setting motor 28. The worm shaft 15 is supported underneath the driving sleeve 19 by an upper radial bearing 30 on the frame 18. The worm shaft 15 is supported at the level of the funnel opening of the feeding funnel 11 by a lower bearing assembly 31, 32.

An agitating device 33 is positioned in the feeding funnel 11. The agitating device 33 is suspended at a sleeve 34 which is rotatable independently of the worm shaft 15. The sleeve 34 is supported directly in the frame 18. The agitating device 33 has a radial arms 35 starting from the sleeve 34. Leaf elements 36 are stiffened by bars 37. A chain wheel 38 is at the upper end of the sleeve 34. The chain wheel 38 enables the agitating device 33 to be independently rotationally driven.

A conveying element is positioned in the lower central region of the feeding funnel. The conveying element is in the form of a worm turn 41 positioned on the worm shaft 15. Underneath the worm turn 41, a union nut 42 connects the two parts of the worm shaft 15. Blades 43 are provided at the closing cone 16. The entire assembly can be suspended above a net weighing device by frame 50.

Figure 3:
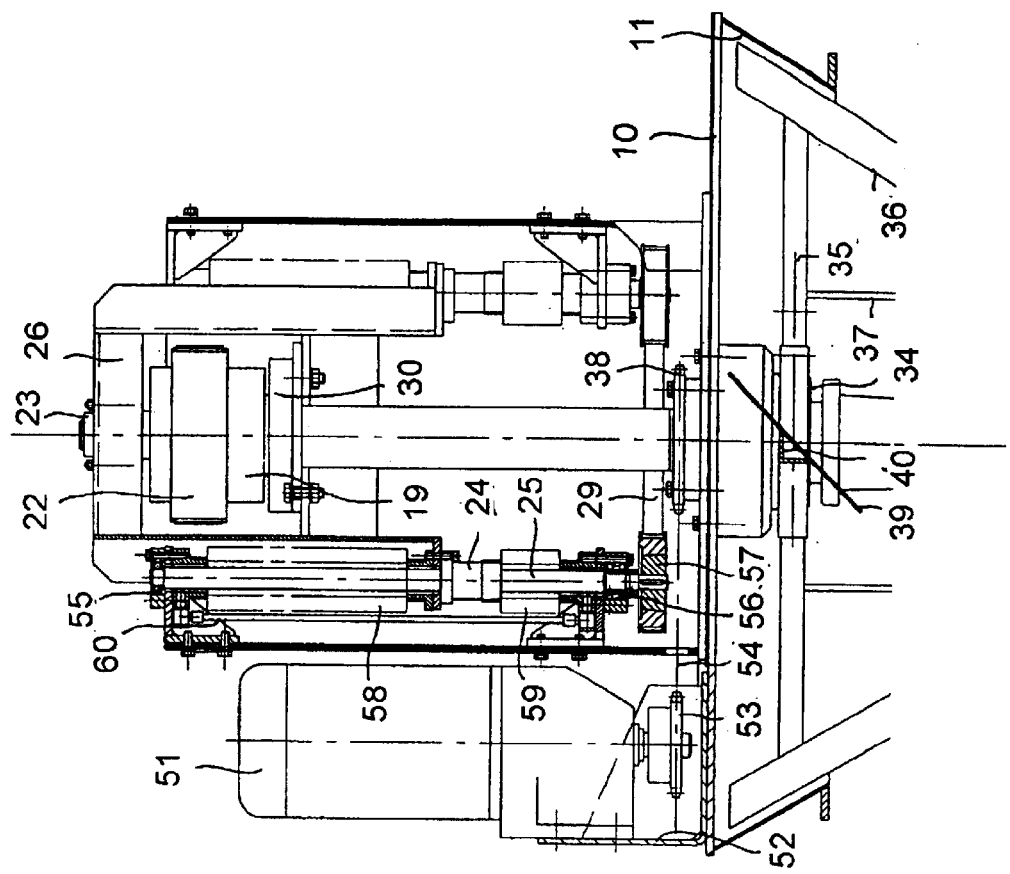
FIG. 3 is a cross-section view of the supporting and driving means according to FIG. 2 positioned perpendicularly relative to FIG. 2.
Figure 2:
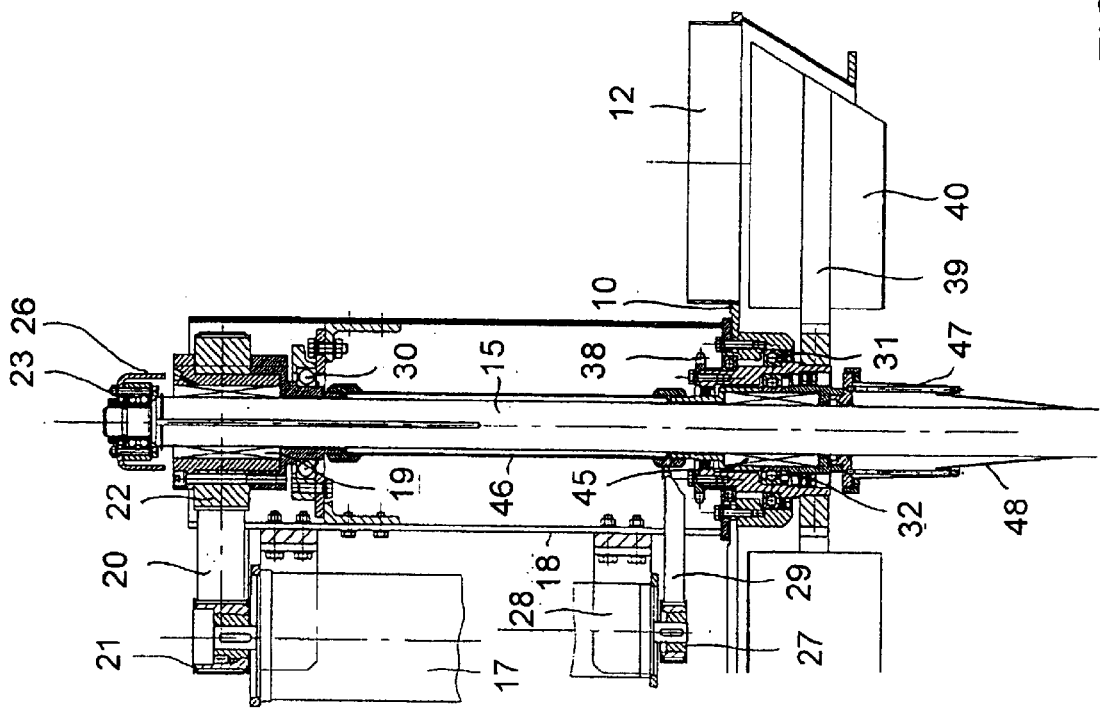
FIG. 2 is an axial section view of the supporting and driving means of the conveying unit and the agitating device according to FIG. 1.

FIGS. 2 and 3 will be described jointly below. Identical details have been given the same reference numbers as in FIG. 1. To that extent, reference is additionally made to the description of FIG. 1.

FIG. 2 compared to FIG. 1, contains additional sectional views showing the upper axial bearing 23 supporting the upper shaft end in the portal carrier 26; the radial bearing 30 supporting the driving sleeve 19 on the frame 18; the lower bearing assembly with an outer radial bearing 31 supporting the sleeve 34 in the frame 18; and an inner radial bearing 32 supporting the worm shaft 15 in the sleeve 34.

A rotational and axial guiding sleeve 45 is slipped on to the worm shaft 15. The sleeve 45 is a ball bush providing rotational and axial guidance by the balls running on the shaft shank. The shaft is sealed towards the outside by a protective tube 46 between the driving sleeve 19 and the rotational and axial guiding sleeve 45. The rotational and axial guiding sleeve 45, at its lower end, is followed by a sleeve 47. The sleeve 47 carries a flexible sealing sleeve 48 sealingly resting against the worm shaft 15.

FIG. 3 shows a further driving motor 51 connected to an supporting iron angle 52. The iron angle 52 is firmly connected to the base plate 10. A chain wheel 53 is positioned on the shaft journal of the driving motor 51. The chain wheel 53, via a chain 54, establishes a driving connection with the chain wheel 38 of the agitating device 33. The portal 26 is a U-structure which opens downwardly. The axial bearing 23 is positioned in the upper transverse carrier. The two arm ends of the portal 26 are connected to spindle nuts 24. The spindle nuts 24 run on spindles 25 which are doubly supported in the frame 18. Upper bearings 55 and lower bearings 56 support the spindles 25. Belt pulleys 57, drivable via the cog belt 29 by the belt pulley 27 of the setting motor 28, are arranged on the spindle journals projecting from the lower bearings. The spindles 25 are rotatingly driven by actuating the setting motor 28. Thus, the spindle nuts 24 together with the portal 26 are lifted and lowered. The portal 26, in turn, lifts and lowers the worm shaft 15, via the axial bearing 23. The spindles 25 are sealed by upper bellows 58 and lower bellows 59. Air equalizing lines 60 are provided to equalize the pressure between the bellows 58, 59.

Conveying blades 39 are attached to the shaft sleeve 34. The conveying blades 39 extend at a gradient relative to the axis. Angle plates 40 attach the conveying blades 39 to the agitating device 33. Leaves 36 extend parallel to the wall of the feeding funnel 11. The conveying blades 39 are not axially displaceable in the feeding funnel. Due to the conveying blades 39 small circumferential extension, low rotation frequency and long distance from the conveying worm 14 and shaft 15 in the filler pipe 13, there is no risk of material compaction. The conveying blades may be replaceable or adjustable with respect of the gradient in order to adapt the conveying blades 39 to the product characteristics.

Figure 4:
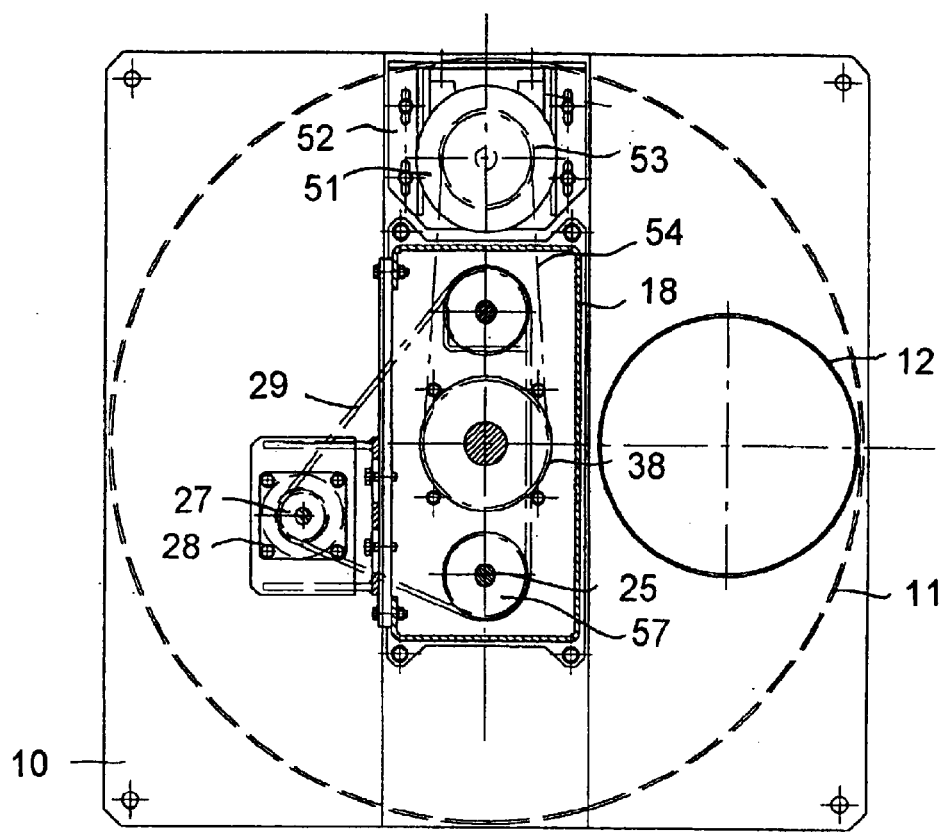
FIG. 4 is a horizontal section view of the supporting and driving means according to FIG. 3.

In FIG. 4, any details identical to those shown in the previous Figures have been given the same reference numbers. To that extent, and in addition, reference is made to the description of the previous Figures. FIG. 4 shows the base plate 10 of the feeding funnel 11 and the filler sleeve 12. The setting motor 28 attached to the frame 18 is secured to the base plate 10. The belt pulley 27, via cog belt 29 is coupled with the belt pulleys 57 of spindles 25. The driving motor 51 via the supporting angle 52 is secured to the base plate 10. The driving motor, via the chain wheel 53, the chain 54 and the chain wheel 38 on sleeve 34, drives the agitating device 33.

Figure 5:
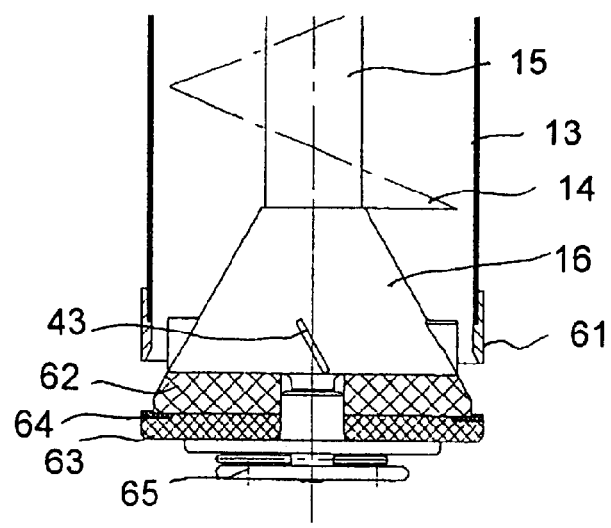
FIG. 5 is an enlarged section view of the closing element through the filler pipe in an open position.

FIG. 5 shows the lower end of the filler pipe 13 with the worm shaft 15 and the conveying worm 14. A valve seat 61 is attached to the end of the filler pipe 13. The worm shaft 15 is followed by the closing cone 16. The upper side of the closing cone 16 includes the above-mentioned blades 43. The lower part of the cone 16 is formed by two plastic discs 62, 63 sandwiching an inserted seal 64. These parts are connected to the cone 16 by holding means 65, not described in greater detail.

While the above detailed description describes the preferred embodiment of the present invention, the invention is susceptible to modification, variation and alteration without deviating from the scope and fair meaning of the subjoined claims.

What is claimed is:

1. A method of filling containers with bulk material by a feeding funnel and a filler pipe, the filler pipe adjoining the lower end of the feeding funnel, comprising:
   providing an axially displaceable and rotatable conveying unit arranged co-axially within the filler pipe;
   providing an axially displaceable and rotatable closing element positioned at the lower end of the filler pipe;
   firmly connecting the closing element to the lower end of the conveying unit;
   adding bulk material into said feeding funnel;
   conveying said bulk material by said conveying unit in said filler pipe; and simultaneously mechanically agitating said bulk material in said feeding funnel.

2. A method according to claim 1, further comprising driving an agitating means agitating the bulk material in the filling funnel at a lower rotation frequency than the rotating frequency of the conveying unit conveying the bulk material in the filler pipe.

3. A method of filling containers with bulk material by a feeding funnel and a filler pipe, the filler pipe adjoining the lower end of said feeding funnel, comprising:
   providing an axially displaceable and rotatable conveying unit arranged co-axially in said filler pipe;
   providing an axially displaceable and rotatable closing element at a lower end of said filler pipe;
   firmly connecting said closing element to the lower end of the conveying unit;
   adding bulk material into said feeding funnel;
   conveying said bulk material by said conveying unit in the filler pipe; and
   simultaneously mechanically conveying said bulk material in said feeding funnel towards the filler pipe.

4. A method according to claim 2, further comprising driving the conveying means conveying the bulk material in the filling funnel at the same rotation frequency as the rotating frequency of the conveying unit conveying the bulk material in the filler pipe.

5. A device for filling containers with bulk material by a conical shaped feeding funnel and a filler pipe, the filler pipe adjoining the lower end of the feeding funnel comprising:
   an axially displaceable and rotatable conveying unit arranged co-axially in said filler pipe;
   an axially displaceable and rotatable closing element positioned at the lower end of the filler pipe, said closing element firmly connected to the lower end of the conveying unit; and
   agitating elements rotatably drivable around a funnel axis, said agitating elements positioned close to the wall of said conical shaped feeding funnel.

6. A device according to claim 5, wherein:
   the agitating elements being leaves which extend parallel to the wall of the feeding funnel.

7. A device according to claim 6, wherein:
   the agitating elements extending axially non-displaceably relative to the funnel axis and at a constant distance from the wall of the feeding funnel.

8. A device according to claim 7, wherein:
   the agitating elements are driven by a separate driving motor.

9. A device for filling containers with bulk material by a conical shaped feeding funnel and a filler pipe, said filler pipe adjoining a lower end of said feeding funnel comprising:
   an axially displaceable and rotatable conveying unit arranged co-axially in said filler pipe;
   an axially displaceable and rotatable closing element positioned at a lower end of the filler pipe, said closing element firmly connected to the lower end of the conveying unit; and
   conveying elements in said feeding funnel rotatably drivable around a funnel axis.

10. A device according to claim 9, wherein:
    the conveying elements in the feeding funnel being conveying worms, conveying blades, or conveying spirals arranged at a gradient relative to the axis of the feeding funnel.

11. A device according to claim 10, wherein:
    the conveying elements in the feeding funnel are arranged at a constant axial distance from the conveying unit in the filler pipe and are driven by the same driving motor as the conveying unit.

12. A device according to claim 9, wherein:
    the conveying elements in the feeding funnel are axially arranged in the feeding funnel and, are driven by a separate driving motor.

* * * * *